United States Patent
Chen et al.

(10) Patent No.: US 9,481,788 B2
(45) Date of Patent: *Nov. 1, 2016

(54) PROCESS FOR PREPARING STABLE AQUEOUS EPOXY RESIN DISPERSIONS

(71) Applicant: Dow Global Technologies LLC, Midland, MI (US)

(72) Inventors: Liang Chen, Midland, MI (US); Liang Hong, Schwenksville, PA (US); David L. Malotky, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/408,104

(22) PCT Filed: Jun. 24, 2013

(86) PCT No.: PCT/US2013/047274
§ 371 (c)(1),
(2) Date: Dec. 15, 2014

(87) PCT Pub. No.: WO2014/004357
PCT Pub. Date: Jan. 3, 2014

(65) Prior Publication Data
US 2015/0299456 A1    Oct. 22, 2015

Related U.S. Application Data

(60) Provisional application No. 61/666,000, filed on Jun. 29, 2012.

(51) Int. Cl.
| C08J 3/05 | (2006.01) |
| C08L 63/00 | (2006.01) |
| C09D 5/02 | (2006.01) |
| C09D 7/02 | (2006.01) |
| C09D 163/00 | (2006.01) |

(52) U.S. Cl.
CPC *C08L 63/00* (2013.01); *C08J 3/05* (2013.01); *C09D 5/027* (2013.01); *C09D 7/02* (2013.01); C08J 2363/00 (2013.01); C08J 2429/04 (2013.01)

(58) Field of Classification Search
CPC ............ C08J 3/05; C08L 63/00; C08D 5/02; C08D 5/024; C08D 5/027; C08D 5/031; C08D 5/036; C08D 163/00
USPC ............................. 523/402, 403; 525/523, 524
See application file for complete search history.

(56) References Cited

U.S. PATENT DOCUMENTS

| | | | |
|---|---|---|---|
| 3,280,734 A * | 10/1966 | Fromson | B41N 3/034 101/456 |
| 3,772,228 A * | 11/1973 | Allen | C08G 59/4223 523/324 |
| 4,123,403 A | 10/1978 | Warner et al. | |
| 4,469,837 A * | 9/1984 | Cattaneo | C08K 5/053 524/387 |
| 5,342,864 A | 8/1994 | Craun et al. | |
| 5,708,059 A * | 1/1998 | Pfeil | C08F 283/10 523/404 |
| 6,204,310 B1 | 3/2001 | Choudhery | |
| 6,221,934 B1 | 4/2001 | Stark et al. | |
| 6,271,287 B1 * | 8/2001 | Piechocki | C08J 3/03 523/402 |
| 6,291,594 B1 * | 9/2001 | Rodrigues | D06M 15/233 525/327.6 |
| 2002/0074681 A1 * | 6/2002 | Lundgard | C08J 3/03 264/78 |
| 2010/0144941 A1 | 6/2010 | Kuhlmann | |
| 2010/0267887 A1 * | 10/2010 | De Velder | C08L 61/06 524/503 |
| 2015/0105492 A1 * | 4/2015 | Chen | C08L 63/00 523/401 |

FOREIGN PATENT DOCUMENTS

| EP | 2537896 A1 | 12/2012 | |
| GB | 1466292 | * 3/1977 | ............. C08L 63/00 |
| WO | 0020489 A1 | 4/2000 | |
| WO | 0020499 A1 | 4/2000 | |

OTHER PUBLICATIONS

2007. Dispersing Agent. Hawley's Condensed Chemical Dictionary. 471.*
2007. Surface-active Agent. Hawley's Condensed Chemical Dictionary. 1196.*
"DuPont PVA Polyvinyl Alcohol Elvanol", Liwei Chemical Co. LTD, 2008, http://www.polyvinyl-alcohol.net/Dupont-pva.html.*
"Crystallinity in poly(vinyl alcohol) 2. Computer modelling of crystal structure over a range of tacticities", Assender et al., 1998.*
William C. Golton, editor, "Analysis of Paints and Related Materials: Current Techniques for Solving Coatings Problems," ASTM STP 1119, Aug. 31, 1992, p. 47.

* cited by examiner

*Primary Examiner* — Michael J Feely
(74) *Attorney, Agent, or Firm* — Andrew E. C. Merriam

(57) ABSTRACT

The present invention relates to a process for preparing stable aqueous epoxy resin dispersions with polyvinyl alcohol (PVOH) in finely divided, solid, or granular form as a primary dispersant, and stable aqueous epoxy resin dispersions made thereof. Specifically, the process is a solvent free continuous extrusion dispersion process.

6 Claims, No Drawings

PROCESS FOR PREPARING STABLE AQUEOUS EPOXY RESIN DISPERSIONS

The present invention relates to a process for preparing stable aqueous epoxy resin dispersions with finely divided or granulare polyvinyl alcohol (PVOH) as a primary dispersant, and stable aqueous epoxy resin dispersions made thereof. Specifically, the process is a solvent free, and continuous extruder-based dispersion process.

Stable aqueous epoxy resin dispersions have received growing demand in the coating industry because of their combined ability to coalesce, low volatile organic compound (VOC) content, and low viscosity.

Conventional aqueous dispersions of epoxy resins have been produced by processes wherein epoxy is dissolved in solvent first and then dispersed by conventional dispersant at ambient temperature, and finally solvent is stripped from the dispersion, or by processes wherein at elevated temperatures a molten epoxy resin and an aqueous medium, and a dispersant are mixed by applying shearing force, such as batch dispersion process through phase inversion.

With market demand for waterborne epoxy coating materials increasing, more and more research efforts have focused on producing high Mw epoxy dispersions. However, those dispersions are prepared via solvent-assisted phase inversion dispersion process, which is not environmental friendly. The need remains for a solvent-free process to prepare high Mw epoxy waterborne dispersion.

More recently, aqueous polyvinyl alcohol (PVOH) solutions were prepared and used to disperse liquid and high Mw solid epoxy resins in either a batch or continuous process without using a solvent.

U.S. Pat. No. 4,123,403 to Warner et al. discloses aqueous polymer microsuspensions having controlled particle size and a narrow particle size distribution as prepared by a continuous extruder dispersion process. In Warner, concentrated PVOH solutions were prepared and used as a dispersant to disperse solid epoxy in water in both batch and continuous processes. Nevertheless, in that process, there are several disadvantages. Because the dissolution of semi-crystalline PVOH in water was very slow, taking several hours at 80 deg. C., high contents of PVOH solids, in solution, could not be achieved in a solvent-free processes and the amount water used in the final dispersion could not be controlled. Further, the PVOH foamed after dissolution, and it takes several days for the solution to defoam.

The present inventors have sought to solve the problem of providing efficient methods for making aqueous epoxy resin dispersions having a controlled mean particle size for coating applications, such as those having average particle sizes smaller than 1 micrometer.

SUMMARY OF THE INVENTION

The present invention provides solvent-free dispersion processes for preparing a stable aqueous epoxy resin dispersion comprising the steps of: i) providing an epoxy resin composition comprising an epoxy resin with an epoxide equivalent weight (EEW) of from 200 to 10000 g/eq, or, preferably, 300 g/eq or higher, or, more preferably, 450 g/eq or higher, and a molecular weight of from 1500 to 40000 g/mol, preferably, 3000 or more; ii) combining the epoxy resin composition with a finely divided or granular dispersant composition comprising a semi-crystalline polyvinyl alcohol in an amount of at least 5.0 wt. % and up to 20 wt. % based on the total weight of the epoxy resin and polyvinyl alcohol, preferably, at least 7 wt. %, or, more preferably, from 7 to 15 wt. %; iii) mixing water with the epoxy resin and dispersant composition; iv) continuously emulsifying said epoxy resin composition in the water in the presence of the semi-crystalline polyvinyl alcohol dispersant under conditions sufficient to melt the epoxy resin, thereby producing a high internal phase emulsion.

The processes may further comprise vi) providing additional water; vii) contacting said high internal phase emulsion with said additional water; viii) thereby producing the aqueous epoxy resin dispersion.

In the process of the present invention, the first epoxy resin, semi-crystalline polyvinyl alcohol can be co-fed into a melt blend zone before the supplying of water.

The epoxy resin composition further comprises from 0.1 wt. % to 50 wt. % based on the total weight of the epoxy resin composition, a second epoxy resin with an epoxide equivalent weight (EEW) of from 100 to 300 g/eq, and a molecular weight of from 200 to 300.

The molecular weight of the finely divided semi-crystalline PVOH is from 10 kg/mol to 200 kg/mol.

The average particle size of the semi-crystalline PVOH is from 0.1 mm to 5 mm.

The dispersant composition further comprises a co-dispersant chosen from a sulfate of an ethoxylated phenol, or a nonionic dispersant having a molecular weight of from 7,000 to 20,000.

The present invention further provides a stable aqueous epoxy resin dispersion made thereof, and preferably the dispersion has an average particle size of less than 1 μm.

Unless otherwise indicated, all temperature and pressure units are room temperature and standard pressure (STP). All ranges recited are inclusive and combinable.

For epoxy resins, unless otherwise indicated, the molecular weight refers to a weight average molecular weight as determined by gel permeation chromatography (GPC) combined with static light scattering (absolute method) based on polystyrene standards.

As used herein, the term "epoxide equivalent weight" refers to the value determined by ASTM D-1652 (1997) (ASTM International, West Conshohocken, Pa.).

As used herein, the phrase "wt. %" stands for weight percent.

As used herein, unless otherwise indicated, the phrase "average particle size" refers to a volumetric particle size equal to the diameter of the sphere that has same volume as a given particle. The particle size distribution may be measured using a Coulter LS 13 320 particle size analyzer (Beckman Coulter, Brea, Calif.) per manufacturer's recommended Procedures via laser scattering. The scattering light from particles through laser scattering and polarization intensity differential scattering is collected as a function of angle, and subsequently converted to a particle size distribution.

The preparation of the stable aqueous epoxy resin dispersion of the present invention comprises conventional mechanical dispersion of an epoxy resin, a dispersant, a semi-crystalline and partially hydrolyzed polyvinyl alcohol (PVOH), in the presence of water. Suitable mechanical dispersion methods may include shearing and, if desired, heating the epoxy resin and the dispersant, with a small amount of water, above the melting temperature (Tm) of the epoxy resin, and the semi-crystalline polyvinyl alcohol (PVOH) or at a temperature that with shearing will heat the epoxy resin, and the semi-crystalline polyvinyl alcohol to melt, to make an aqueous epoxy resin dispersion and, if needed, diluting the aqueous epoxy resin with water while shearing the resulting mixture to form an aqueous epoxy resin dispersion, having a average particle size of less than 1 μm. We do not mean limit the average particle size of the epoxy resin dispersions, but by using the process of the present invention, epoxy resin dispersions with average particle size less than 0.5 micrometer can be easily prepared, which is not that easy for prior processes. By using the process of the present invention, epoxy resin dispersions with different, larger average particle size can also be prepared, for example, average particle size from 0.5 to 1 μm, from 1 to 5 μm, etc.

Suitable shearing methods include extrusion and melt kneading in a known manner including, for example, in a kneader, a Banbury mixer, single-screw extruder, or a multi-screw extruder. The melt kneading may be conducted under the conditions which are typically used for melt kneading an epoxy resin and a semi-crystalline PVOH. A preferred melt-kneading machine is, for example, a multi screw extruder having two or more screws, to which a kneading block can be added at any position of the screws. If desired, an extruder may be provided with a first material-supplying inlet, such as for adding water or liquid epoxy resin, a second material-supplying inlet, such as for the semi-crystalline PVOH, and solid epoxy resin and further third and forth material-supplying inlets in this order from the upstream to the downstream along the flow direction of a material to be kneaded. Further, a vacuum vent may be added. In one embodiment, the dispersion is first diluted to contain about 10 to about 20% by weight of water and then subsequently further diluted to comprise greater than 25% by weight of water. The further dilution may provide a dispersion with at least about 30% by weight of water.

Exemplary methods for preparing stable aqueous epoxy resin dispersions are also disclosed in, for example, U.S. Pat. Nos. 3,360,599, 3,503,917, 4,123,403, 5,037,864, 5,539,021, and WO 2005085331 A. Melt kneading methods are disclosed, for example, in U.S. Pat. Nos. 5,756,659 and 6,455,636.

The processes of the present invention may include up to 10 wt. %, based on the total weight of the epoxy resin dispersions of an organic solvent or fugitive plasticizer. Preferably, the stable aqueous epoxy resin dispersions are formed in the absence of any organic solvent, which means less than 1000 ppm or, preferably, less than 500 ppm of solvent. %, based on the total weight of the epoxy resin dispersions.

In extruding to form a mechanical dispersion, a first epoxy resin (a solid epoxy resin in the present invention), and a semi-crystalline PVOH are supplied to the feed throat of the extruder via a loss-in-weight feeder, such as Schenck Mechatron feeder and then melt blended. Initial aqueous stream (IA) is then injected into the extruder after the melt blend zone and melt blended epoxy resin is then emulsified in the presence of IA, and thereby produces a high internal phase emulsion (HIPE). A second epoxy resin (a liquid epoxy resin in the present invention) stream may be injected into the melt blend zone to melt blend with the first epoxy resin and the semi-crystalline PVOH before entering the emulsification zone. A co-dispersant solution may be delivered with the initial aqueous stream (IA) through injector into the extruder. The emulsion phase was then conveyed forward to the dilution and cooling zone of the extruder where additional water was added to form the aqueous epoxy resin dispersions having solid level contents in the range of from less than 70 weight percent. The initial aqueous stream, the dilution water, co-dispersant solution, and second epoxy resin were all supplied by high pressure positive displacement pumps, such as, an Isco dual syringe pumps (500 ml), or a Gear pump of Zenith Pumps Division, Parker Hannifin Corporation.

Preferably, if the co-dispersant is finely divided it is fed into the extruder together with the semi-crystalline PVOH.

The one or more of the epoxy resins and the semi-crystalline PVOH may in molten form be fed into a first mixing device, such as a rotor stator mixer, and brought into contact with water, and optionally a co-dispersant, thereby forming a high internal phase emulsion. Subsequently, the high internal phase emulsion is contact with additional water, thereby producing the epoxy dispersion of the present invention. The one or more said epoxy resins may be melted via, for example, a melt pump.

Within the meaning of the present invention the first and the second epoxy resin for use herein is a polyglycidyl ether of a polyhydroxy compound, such as a monomeric polyhydroxy compound e.g. a polyhydroxy hydrocarbon, or a hydroxyl-functional oligomer. Preferably, the polyglycidyl ether is an oligomeric or polymeric compound having at least 2 hydroxyl groups. Typically, the epoxy resin is the reaction product of a polyhydroxy compound, such as a monomeric polyhydroxy compound e.g. a polyhydroxy hydrocarbon, or a hydroxyl-functional oligomer, with an epihalohydrin, such as epichlorohydrin. The polyhydroxy hydrocarbon can be substituted, if desired, with one or more non-interfering substituents, such as halogen atoms, ether radicals, lower alkyls and the like. Examples of polyhydroxy hydrocarbons include polyhydric phenols and polyhydric alcohols. Specific non-limiting examples of monomeric polyhydroxy compounds are resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, tetra-methylbiphenol, tetramethyl-tetrabromobiphenol, tetramethyltribromobiphenol, tetrachlorobisphenol A, 4,4'-sulfonyldiphenol, 4,4-oxydiphenol, 4,4'-dihydroxybenzophenone, 9,9'-bis(4-hydroxyphenyl)fluorine, 4,4'-dihydroxybiphenyl, and 4,4'-dihydroxy-α-methylstilbene. Examples of hydroxyl-functional oligomers include phenol-formaldehyde novolak resins, alkyl substituted phenol-formaldehyde resins, phenol-hydroxybenzaldehyde resins, cresol-hydroxybenzaldehyde resins, dicyclopentadiene-phenol resins, and dicyclopentadiene-substituted phenol resins. The polyglycidyl ethers can be prepared by reacting an epihalohydrin, preferably epichlorohydrin, with the polyhydroxy compound including a halogenated polyhydroxy compound under such conditions to prepare the desired product. Such preparations are well known in the art (see for example U.S. Pat. No. 5,118,729, columns 4-7 and "Epoxy resins" by Pham, H. Q. and Marks, M. J. in Ullmann's Encyclopedia of Industrial Chemistry, Wiley-VCH Verlag, Weinheim, 2005). Modified epoxy resins such as epoxy resins wherein part of the above mentioned fundamental reactants has been substituted by modified compounds are also encompassed by the term "epoxy resin". Oligomers and polymers obtained by free radical polymerization of monomer mixtures comprising ethylenically unsaturated epoxy compounds are not included by the definition of epoxy resin herein.

In accordance with the present invention, the polyhydroxy compound used to prepare the epoxy resin is a polyhydroxy hydrocarbon, preferably an aromatic dihydroxy compound, such as bisphenol A and/or bisphenol F. An oligomeric or polymeric compound such as a phenol-formaldehyde novolac may be used as the polyhydroxy compound. Preferred examples of epoxy resins for use in the present invention include the diglycidyl ether of bisphenol A which is an oligomer of diglycidylether of bisphenol A, typically the reaction product of epichlorohydrin and bisphenol A; the diglycidyl ether of bisphenol F which is an oligomer of diglycidyl ether of bisphenol F, typically the reaction product of epichlorohydrin and bisphenol F; a mixed diglycidyl ether of bisphenol A and F, which is an oligomer of diglycidyl ether of bisphenol A and F, typically the reaction product of epichlorohydrin and a mixture of bisphenol A and F; the diglycidyl ether of a phenol-formaldehyde novolak which is an oligomer or polymer of diglycidyl ether of a phenol-formaldehyde novolak, typically the reaction product of epichlorohydrin and a phenol-formaldehyde novolak; and modified epoxy resins such as epoxy resins, e.g. bisphenol A based epoxy resins, modified with an epoxy functional surfactant, typically an epoxy functional nonionic or epoxy functional anionic surfactant, and/or poly(alkylene glycol) epoxide, typically poly(propylene glycol) epoxide or poly(ethylene glycol) epoxide. In embodiments of the invention, the thermosettable epoxy resin is a linear, non-cross-linked polymer of bisphenol A and epichlorohydrin having terminal epoxide groups. A specific example of a thermosettable epoxy resin which may be employed herein is D.E.R.™ 664 U solid epoxy resin has medium molecular weight, and is the solid reaction product of epichlorohydrin and bisphenol A, having a softening point of 100° C. to 110° C., (The Dow Chemical Company, Midland, Mich.).

The first epoxy resin (solid epoxy resin) of the present invention has an epoxide equivalent weight within the range of from 200 to 10000 g/eq, or, preferably, from 450 to 7500 g/eq, or, more preferably, from 750 to 5000 g/eq; and its molecular weight is within the range of from 1500 to 40000, more preferably, from 2000 to 20000, and most preferably, from 3000 to 15000.

Optionally, the epoxy resin composition of the present invention comprises a second epoxy resin. The second epoxy resin is commonly understood as a liquid epoxy resin, and is from 0.1 wt. % to 50 wt. %, preferably, from 5 wt. % to 45 wt. %, and most preferably from 10 wt. % to 40 wt. % based on the total weight of the epoxy resin composition. The second epoxy resin has an epoxide equivalent weight of from 100 g/eg to 300 g/eg, more preferably, from 150 g/eg to 200 g/eg, and a molecular weight of from 200 to 600, more preferably, from 300 to 400, may be further employed. The epoxide equivalent weight is determined according to ASTM D 1652 (1997), and the molecular weight is determined according to gel-permeation chromatography (GPC) using polystyrene standard.

In accordance with the present invention, the dispersant may include a finely divided semi-crystalline polyvinyl alcohol (PVOH) alone, or in combination with other conventional co-dispersants. Semi-crystalline PVOH which may preferably be employed in the present invention may have a viscosity DIN 53015 (Viscometry—Measurement of viscosity by means of the rolling ball viscometer by Hoeppler) ranging from 2±0.5 mPa-s to 18±0.5 mPa-s (4% aqueous solution at 20° C.) or more, a degree of hydrolysis (saponification) of 87.7±1.0 mol. %, an ester value DIN 53401 (Determination of saponification value) of 140±10 mg KOH/g, a residual acetyl content of 10.8±0.8 w/w %, and a maximum ash content of 0.5% (calculated as $Na_2O$), such as POVAL PVA 205, which is commercially available from Kuraray Europe GmbH, produced at Singapore; and MOWIOL™ 4-88, MOWIOL™ 18-88 and MOWIOL™ 23-88 G2 poly(vinylalcohol)s from Kuraray Europe GmbH, Division PVA/PVB Frankfurt am Main, Germany. MOWIOL™ 4-88 partially hydrolyzed PVOH (polyvinylalcohol) in granular form, has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$). MOWIOL™ 18-88 partially hydrolyzed PVOH poly(vinylalcohol) in granular form, has a viscosity DIN 53015 of 18±2 mPa-s (4% aqueous solution at 20° C.), a degree of hydrolysis (saponification) of 87.7±1.0 mol. %. MOWIOL™ 23-88 G2 partially hydrolyzed PVOH (polyvinylalcohol) is in fine powder form, having a viscosity DIN 53015 of 23±1.5 mPa-s (4% aqueous solution at 20° C.), a degree of hydrolysis (saponification) of 87.7±1.2 mol. %. Poval™ PVA 205 partially hydrolyzed PVOH (polyvinylalcohol) is in fine granular form, having a viscosity JIS K6726 of 5.0±0.4 mPa-s (4% aqueous solution at 20° C.), a degree of hydrolysis (saponification) of 87.7±1.0 mol. %.

The dispersant, semi-crystalline polyvinyl alcohol may be employed in an amount such that the solid content of the semi-crystalline polyvinyl alcohol is at least 2.5% by weight, preferably from 5% by weight to 15% by weight, more preferably from 7.5% by weight to 10% by weight, based upon the total weight of the epoxy resin.

It is preferably, the Mw of the semi-crystalline PVOH is from 5 to 400 kg/mol, more preferably, it is from 10 to 200 kg/mol, and most preferably, it is from 20 to 150 kg/mol.

For polyvinyl alcohol, the PVOH molecular weight, unless otherwise indicated, means the mean weight of the molar masses, Mw, determined by gel permeation chromatography (GPC) combined with static light scattering (absolute method) on re-acetylized specimens.

It is preferably, the average particle size of the semi-crystalline PVOH is from 0.1 to 5 mm, more preferably, it is from 0.2 to 2 mm, and most preferably, it is from 0.1 to 1 mm.

It is preferably, the hydrolysis degree of the semi-crystalline PVOH is between 50-99%, more preferably between 60-95%, and most preferably between 80-90%.

The co-dispersant suitable for the present invention should maintain its efficiency at relatively high temperature (e.g. at 80-150 CC, preferably from 90 to 130° C.) when preparing the epoxy dispersion.

An example of a class of the suitable co-dispersant is a sulfate of an ethoxylated phenol represented by the formula:

$$\phi\text{-}(\text{CH}_2\text{---}\text{CH}_2\text{---}\text{O})_n\text{---}SO_3^-Z^+$$

wherein φ is acromatic group substituted phenol, preferably Di- and Tristyrenated phenol; n is from 10 to 40, preferably from 14 to 20; and Z is sodium, potassium, or ammonium, preferably ammonium.

Many of the preferred and more preferred sulfates of ethoxylated phenols are commercially available, for example, E-SPERSE 100, a PEO (14) Di- and Tristyrenated Phenol ammonium sulfate; E-SPERSE 701, a PEO (20) Di- and Tristyrenated Phenol sodium sulfate commercially available from Ethox Chemicals LLC.

Another example of a class of the suitable co-dispersant is a nonionic dispersant characterized by having a molecular weight of greater than 7,000 and not more than 20,000. Preferably, this high temperature nonionic dispersant has the following structure:

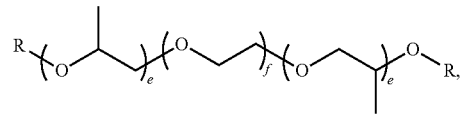

wherein each f is not less than 20, preferably not less than 40, and not greater than 100, preferably not greater than 80; and e is not less than 80, more preferably not less than 90; and preferably not greater than 400, more preferably not greater than 200, and most preferably not greater than 150. R is an epoxide functional group or hydrogen.

Examples of commercially available high temperature nonionic dispersants include ATSURF 108 dispersant (Imperial Chemical Industries PLC (ICI)), PLURONIC F 108 dispersant (BASF Corp.), each with a molecular weight of 14,600 (f=50; e=133, R=H), Polyepoxy Emulsifier 551 (The Hanson Group, LLC) (unknown f and e, while R is a glycidyl ether group).

The co-dispersant is used in an amount of from 0.1 to 10%, preferably from 0.1 to 4% by weight based on the total weight of the epoxy resins.

The following examples are provided for illustrative purposes only and are not intended to limit the scope of the claims that follow. Unless otherwise indicated, all parts and percentages are by weight, all temperatures are in ° C., and all pressures are in bars or atmospheric unless otherwise indicated to the contrary:

EXAMPLES

I. Raw Materials

Dispersants Used in Experiments are Summarized in the Table Below

| Tradename | Chemical nature | Function | Supplier | Mw (kg/mol) | Powder size |
|---|---|---|---|---|---|
| MOWIOL ™ 488 | Polyvinyl alcohol | dispersant | Kuraray Co., Ltd. | 31.0 | 1-4 mm |
| POVAL ™ PVA 205 | Polyvinyl alcohol | dispersant | Kuraray Co., Ltd. | N/A | 0.2-1 mm |
| MOWIOL ™ 1888 | Polyvinyl alcohol | dispersant | Kuraray Co., Ltd. | 130 | 1-4 mm |
| MOWIOL ™ 2388 G2 | Polyvinyl alcohol | dispersant | Kuraray Co., Ltd. | 150 | 200 µm |
| E-SPERSE 100 ™ | PEO (14) di- and Tri-styrenated Phenol ammonium sulfate | co-dispersant | Ethox Chemicals | NA | NA |

Epoxy Resins Used in Experiments are Summarized Below

| Tradename | Chemical nature | Function | Supplier | EEW (gram/eq) | Mw (g/mol) |
|---|---|---|---|---|---|
| D.E.R. ™ 331 | diglycidyl ether of bisphenol A | Liquid epoxy resin | The Dow Chemical Company | 182-192 | 380 |
| D.E.R. ™ 664U | | Solid epoxy resin | The Dow Chemical Company | 875-955 | 3000 |
| D.E.R. ™ 667E | | Solid epoxy resin | The Dow Chemical Company | 1600-1950 | 10000 |

EEW: epoxy equivalent weight
Mw: weight average molecular weight

II. Processes

The Epoxy Dispersions 1, and 3 to 5 were prepared utilizing a KWP (Krupp Werner & Pfleiderer) ZSK25 extruder (25 mm screw diameter, 60 L/D rotating at 450 rpm) according to the following procedure with the formulation components for each aqueous dispersion being reported in Tables 1 to 4 below. The solid epoxy resin and the semi-crystalline PVOH polymer were supplied to the feed throat of the extruder via a Schenck Mechatron loss-in-weight feeder and then melted blended, and then emulsified in the presence of initial aqueous stream. In some cases, for the epoxy blend dispersions shown in example 4, a liquid epoxy resin stream was injected into the melt zone to blend with the solid epoxy resin and semi-crystalline PVOH before emulsification. The emulsion phase was then conveyed forward to the dilution and cooling zone of the extruder where additional dilution water was added to form the aqueous dispersions having solid level contents in the range of from less than 70 weight percent. The initial aqueous stream, and the dilution water were all supplied by Isco dual syringe pumps (500 ml). The barrel temperature of the extruder was set to 110° C. After the dispersion exited the extruder, it was further cooled and filtered via a 200 µm mesh size bag filter.

The Comparative Epoxy Dispersion 2 using a PVOH solution as dispersant was prepared utilizing a Bersdorff extruder (25 mm screw diameter, 36 L/D rotating at 450 rpm). D.E.R.™ 664 U epoxy was fed by a loss-in-weight feeder. The melt zone of the extruder was maintained at 75° C. below the softening temperature of the epoxy resin (100° C.) to prevent epoxy resin flakes from caking at the bottom of the feed throat and the melt seal from rupturing. The MOWIOL 488 solution (27 wt % solid) was delivered by a pair of 500 mL Isco syringe pumps. The PVOH solution was too viscous to load by suction, and was poured into the empty Isco tubes, using a 0.5 inch diameter transfer line between the pump and the extruder to prevent high pressure from building up. A melt zone temperature of 75° C., an emulsification zone of 110° C. and a dilution zone of 110° C. was employed to produce the smallest amount of undispersed epoxy.

During the run, small samples are collected on a regular basis for particle size analysis in the Beckman Coulter LS 13 320 Laser Light Scattering Particle Sizer (Beckman Coulter Inc.) using the standard procedure of ISO 13320-1. Adjustments to process parameters such as flow rates, temperatures, and screw speed are made to generate the desired dispersion. Dispersion pH was measured using a Denver Instruments pH meter. Solids analysis was performed with an Ohaus MB45 moisture analyzer. Viscosity was measured on a Brookfield rotational viscometer at stated conditions.

Example 1

Solid PVOH Feed Vs PVOH Solution Feed as Dispersant

TABLE 1

Solid epoxy dispersions with Solid PVOH

| Dispersion | Epoxy resin (part) | Dispersant[b] (part) | solid % in HIPE[d] | $V_{mean}$ (μm) |
|---|---|---|---|---|
| 1 | DER 664U (91) | Mowiol ™ 488 (9) | 86 | 0.87 |
| 2 | DER 664U (91) | Mowiol ™ 488 in solution (9)[c] | 80 | 1.29 | a. Solid epoxy resin feed rate = 100 g/min.
[b]Semi-crystalline PVOH was fed at 10.0 g/min.
[c]The epoxy dispersion was prepared on the Berstorff extruder and a 27% Mowiol ™ 488 dispersant in solution
[d]Solid content in HIPE phase to produce the smallest particle size. For dispersion 1, the corresponding IA feed rate was 17.9 g/min; for dispersion 2, IA was from the Mowiol ™ 488 aqueous solution Generally, in the continuous extruder-based dispersion process, the initial aqueous stream (IA) is adjusted to minimize the particle size. Feeding semi-crystalline PVOH directly as dispersant enables us to achieve smaller epoxy particle size by adding less water in the HIPE zone, compared with the epoxy dispersion prepared with using PVOH solution.

Example 2

Effect of Powder Size of PVOH on Epoxy Particle Size in Dispersion

Several epoxy resin dispersions were prepared and summarized in Table 2. Minimum particle sizes and corresponding solid content in HIPE are listed in the table. POVAL™ PVA 205 is a fine granular grade of PVOH, very similar to Mowiol™ 488 in terms of chemistry. A smaller particle size of 0.43 μm was achieved (compared with dispersion 1 in Table 1) with the same amount of PVOH. In other words, because of smaller particle size of the solid granule, POVAL™ PVA 205 is more efficient than Mowiol™ 488. In addition, as low as 7% POVAL™ PVA 205 can be used to prepare epoxy dispersion.

TABLE 2

Solid epoxy dispersions with POVAL ™ PVA 205

| Dispersion | Epoxy resin (part) | Dispersant (part) | solid % in HIPE zone[d] | $V_{mean}$ (μm) |
|---|---|---|---|---|
| 3 | DER664U (91) | PVA205 (9) | 86 | 0.43 |
| 4 | DER664U (91) | PVA205 (9) | 88 | 0.71 |
| 5 | DER664U (91) | PVA205 (9) | 84 | 0.72 |
| 6 | DER664U (93) | PVA205 (7) | 86 | 0.736 |

Solid epoxy resin feed rate = 100 g/min. semi-crystalline PVOH was fed at 10.0 g/min for dispersions 3 to 5 and 7.5 g/min for dispersion 6.
IA feed rate can be calculated by [FeedRate(epoxy) + FeedRate(PVOH)]/(solid % in HIPE) − [FeedRate(epoxy) + FeedRate(PVOH)]

Example 3

Effect of PVOH Mw on Particle Size

In Table 3, the IA in HIPE phase required to achieve minimum particle size is also dependent on the molecular weight of PVOH, in other words, high molecular weight PVOH as a dispersant required more water in the emulsification zone. Again, fine powder grade PVOH (MOWIOL™ 2388 G2) produced smaller epoxy particles in dispersion.

TABLE 3

| Dispersion | Epoxy resin (part) | Dispersant (part) | solid % in HIPE zone[d] | $V_{mean}$ (μm) |
|---|---|---|---|---|
| 1 | DER 664U (91) | MOWIOL ™ 488 (9) | 86 | 0.87 |
| 7 | DER 664U (91) | MOWIOL ™ 2388G2 (9) | 80 | 0.70 |
| 8 | DER 664U (91) | MOWIOL ™ 1888 (9) | 80 | 0.90 |

Solid epoxy resin feed rate = 100 g/min and semi-crystalline PVOH was fed at 10.0 g/min.
IA feed rate is 27.5 g/min

Example 4

Epoxy Blend Dispersions without Co-Dispersant

Epoxy blend dispersions were also prepared by the extruder-based dispersion process. As described in the process, liquid epoxy was injected into the extruder to melt blend with solid epoxy and semi-crystalline Mowiol™ 488 in situ and then emulsified.

Dispersion 9 in Table 4 is an epoxy blend dispersion, with composition listed below. DER 667E/DER 331(75/25) means the weight ratio of two resins is 75 to 25.

Furthermore, in addition to use semi-crystalline PVOH only, a co-dispersant can be used in the dispersion process (dispersant 10).

TABLE 4

Epoxy blend dispersion

| Dispersion | Epoxy blend (part) | Dispersant | Co-dispersant | Solid % in HIPE | $V_{mean}$ (μm) |
|---|---|---|---|---|---|
| 9 | DER667E/DER331 (75/25) 100 part | PVA 205 10 part | None | 88% | 0.42 |
| 10 | DER667E/DER331 (60/40) 100 part | MOWIOL ™ 488 PVOH 9 part | E-SPERSE 100 1 part | 88% | 0.35 |

The ratios in the parenthesis indicate the composition of the epoxy blend
Solid epoxy resin feed rate = 100 g/min. and semi-crystalline PVOH was fed at 10.0 g/min.
IA feed rate is 27.5 g/min.

We claim:

1. A continuous process for preparing a stable aqueous epoxy resin dispersion in the absence of organic solvent, comprising:
   co-feeding a solid epoxy resin, a semi-crystalline polyvinyl alcohol dispersant, an optional liquid epoxy resin, and an optional finely divided co-dispersant into a melt blend zone of a shearing device;
   forming a melt blend of the solid epoxy resin, the semi-crystalline polyvinyl alcohol dispersant, the optional liquid epoxy resin, and the optional finely divided co-dispersant in the melt blend zone;

combining the melt blend with water and an optional co-dispersant solution; and forming a high internal phase emulsion of the melt blend, the water, and the optional co-dispersant solution;

wherein the solid epoxy resin has an epoxide equivalent weight of from 300 to 10000 g/eq and a molecular weight of from 1500 to 40000; and wherein the semi-crystalline polyvinyl alcohol dispersant is co-fed into the melt blend zone in a finely divided or granular state, yielding a solid content of at least 5.0 wt. % based on the total weight of epoxy resin plus semi-crystalline polyvinyl alcohol dispersant.

2. The process according to claim 1, further comprising:

combining the high internal phase emulsion with additional water in a dilution and cooling zone; and forming a diluted dispersion of the internal phase emulsion and the additional water in the dilution and cooling zone.

3. The process according to claim 1, wherein the liquid epoxy resin is present in the melt blend, has an epoxide equivalent weight of from 100 to 300 g/eq, and has a molecular weight of from 200 to 300.

4. The process according to claim 1, wherein the semi-crystalline polyvinyl alcohol dispersant has a molecular weight of from 10 kg/mol to 200 kg/mol.

5. The process according to claim 1, wherein the semi-crystalline polyvinyl alcohol dispersant has an average particle size of from 0.1 mm to 5 mm.

6. The process according to claim 1, wherein the co-dispersant solution is present in the high internal phase emulsion; and the co-dispersant is a sulfate of an ethoxylated phenol or a nonionic dispersant having a molecular weight of from 7,000 to 20,000.

* * * * *